United States Patent [19]
Brown

[11] 4,018,302
[45] Apr. 19, 1977

[54] LIQUID-LUBRICATED ROLL WITH ANTI-FLOODING BARRIERS

[75] Inventor: Richard P. Brown, Assonet, Mass.

[73] Assignee: Mount Hope Machinery Company, Incorporated, Taunton, Mass.

[22] Filed: Apr. 4, 1974

[21] Appl. No.: 457,726

[52] U.S. Cl. .............................. 184/6.26; 137/57; 184/14; 251/65; 277/134; 308/20; 308/36.4

[51] Int. Cl.² ..................... F16N 7/32; F16N 31/00

[58] Field of Search ................. 184/6.26, 6.27, 17, 184/14, 18, 26, 29, 31, 33, 35, 36, 70, 72, 77, 80, 101, 103 R, 103 A, 66, 54, 23; 251/65; 277/134, 25; 137/56; 308/20, DIG. 5, DIG. 11, 36.4, 36.5, 78, 85 A, 85 B, 86, 91, 105, 108, 109, 110, 112, 116, 117, 118, 119, 240, 243, 36.1, 187, 187.1; 193/37; 29/110, 117, 148.4 L, 148.4 S

[56] References Cited

UNITED STATES PATENTS

| | | | |
|---|---|---|---|
| 1,977,081 | 10/1934 | Olsen | 277/134 X |
| 3,026,903 | 3/1962 | Roach | 251/65 X |
| 3,627,390 | 12/1971 | Irwin | 308/36.4 X |
| 3,746,129 | 7/1973 | Knapp et al. | 184/6.26 |

FOREIGN PATENTS OR APPLICATIONS

| | | | |
|---|---|---|---|
| 433,892 | 5/1927 | Germany | 277/134 |
| 500,130 | 2/1939 | United Kingdom | 308/20 |
| 657,965 | 10/1951 | United Kingdom | 277/134 |

Primary Examiner—Richard C. Pinkham
Assistant Examiner—Arnold W. Kramer
Attorney, Agent, or Firm—Kenway & Jenney

[57] ABSTRACT

A liquid-lubricated roll has an annular roller element rotatably supported by anti-friction bearings on an elongated axle which is longitudinally curved. Liquid lubricant for the bearings is supplied to an annular passageway between the roller element and the axle. During rotation of the roller, the liquid forms into a thin annular layer on its inner surface, which is agitated by projections on the axle to produce a lubricating mist.

Barrier rings placed adjacent to the bearings are adapted to permit liquid to flow along the passageway while the roll is rotating, but to block flow of liquid above a selected level when the roll is stationary. This maintains a more uniform longitudinal distribution of liquid within the roll during periods of disuse, so that none of the bearings will be flooded when rotation starts, and a saving in power consumption and bearing life will therefore be realized.

35 Claims, 7 Drawing Figures

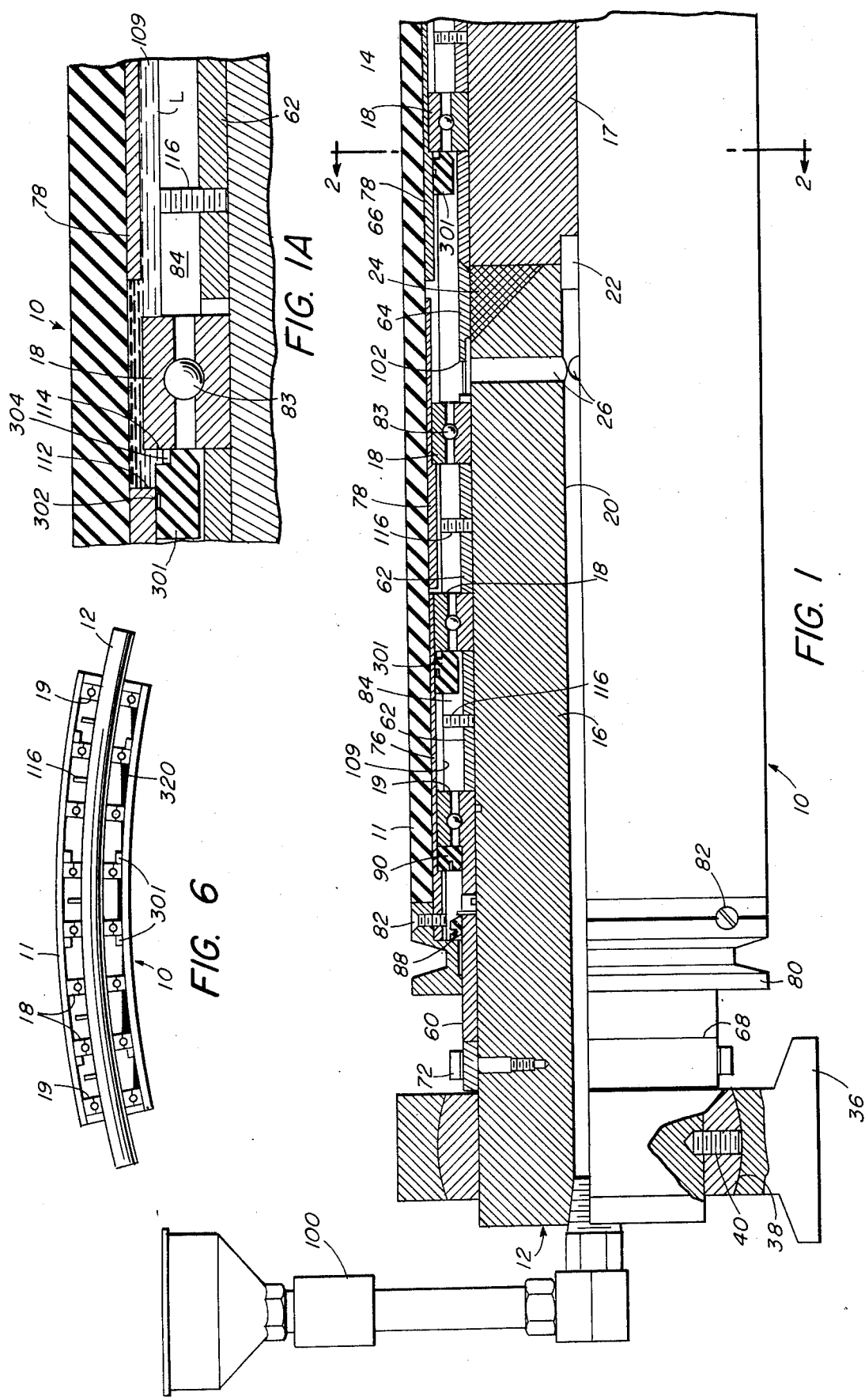

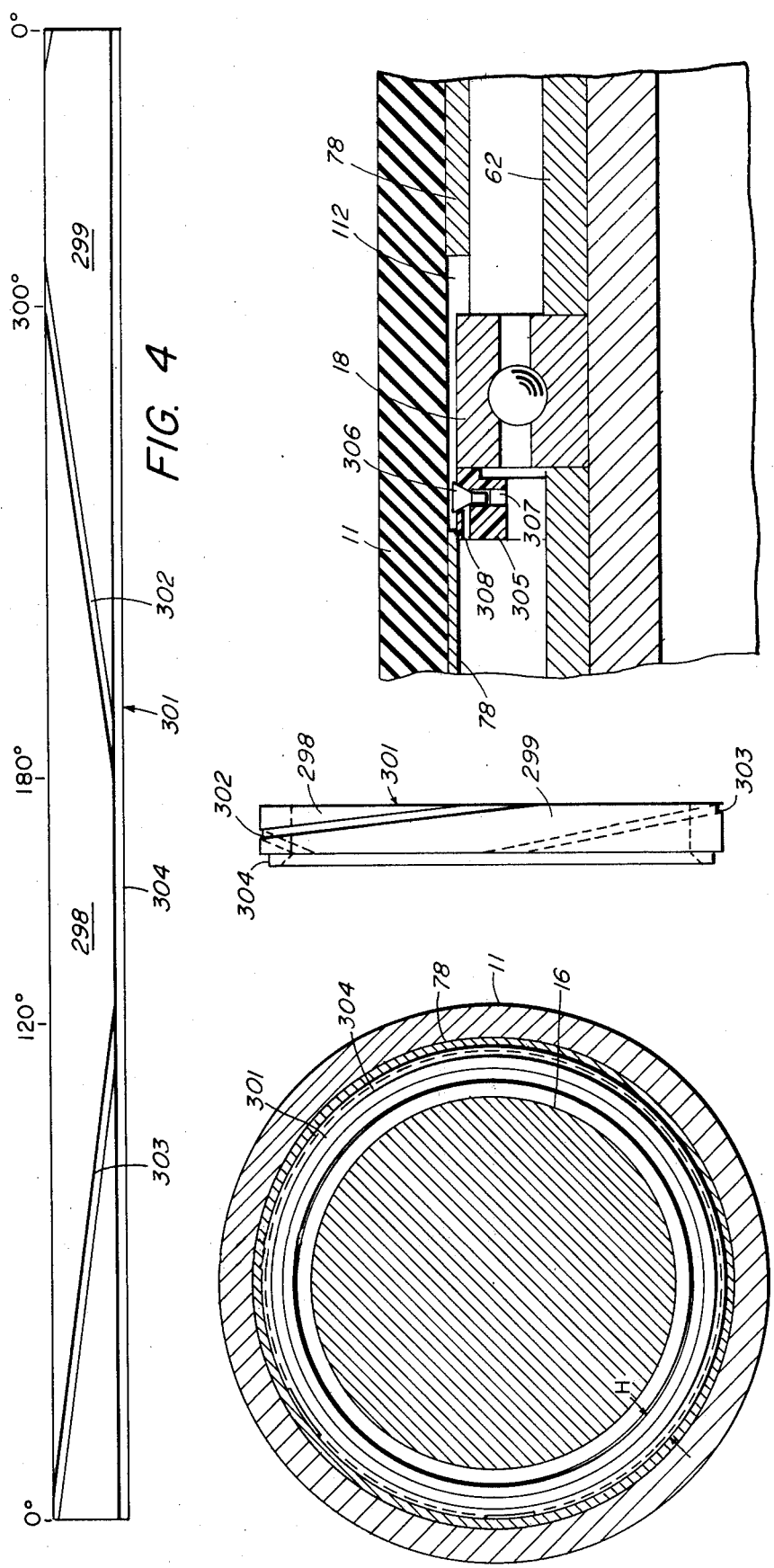

LIQUID-LUBRICATED ROLL WITH ANTI-FLOODING BARRIERS

BACKGROUND AND BRIEF DESCRIPTION OF THE INVENTION

The present invention relates to an improvement in liquid-lubricated rolls of a type illustrated by U.S. Pat. No. 3,746,129, issued July 17, 1973 to George P. Knapp et al.

Curved rolls of a type conventionally used in processing paper, textiles, and other flexible sheet materials, comprise hollow annular roller means mounted by means of anti-friction bearings to rotate about elongated stationary axles, which are longitudinally curved to give the rolls the desired shape. The aforementioned U.S. Pat. No. 3,746,129 discloses and claims a roll which uses oil or other liquid to lubricate the bearings, in place of grease, to promote longer bearing life and to allow operation at higher speeds than are suitable for grease-lubricated rolls.

It is not acceptable to flood the bearings with liquid lubricant, since the submergence of their rollers or balls produces turbulent splashing that consumes an excessive amount of power to turn the roll, and generates an intolerable amount of heat. The aforementioned Patent provides means for maintaining a thin layer of lubricant on the inside of the roller during rotation, and for agitating the inner surface of this layer to generate a lubricating mist which passes into the bearings. Thus the bearings are lubricated without flooding, so long as the roll is rotating. However, a difficulty arises when the curved roll stops rotating for a time.

Except in the rare case where the plane of curvature of the axle is horizontal, the lubricant drains either to the midportion of the roll or to its ends, whichever happens to be lower. When rotation resumes, the lubricant will eventually distribute itself evenly throughout the length of the roll; however, this takes an appreciable time, during which the bearings in the vicinity of the lower parts of the roll remain flooded with lubricant. This increases the power consumed in turning the roll, which is wasteful and furthermore causes localized heating that adversely affects bearing life. Moreover, if the roll is oriented so that the lubricant collects at its ends, and if the end seal means are of the type which open when the roll turns faster than a specified speed, some of the lubricant may pass the seal means and be lost during the period of time when the lubricant is redistributing itself evenly through the length of the roll.

The general objects of this invention are to conserve power used in turning curved rolls, and to increase the life of their bearings. It is a specific object to provide a means for preventing lubricant from accumulating in the lowest longitudinal region of a curved roll when it is stationary, but for permitting the lubricant to distribute itself evenly through the length of the roll when the roll is rotating. Further objects and advantages of the invention will appear as the following description proceeds.

The invention is concerned with curved rolls of a kind known per se, having an elongated longitudinally-curved axle along which a series of anti-friction bearings are spaced by a series of interposed collars, and hollow annular roller means mounted on the bearings to form the rotating working surface for engaging whatever flexible sheet material is to be handled. The roller means may include a series of short cylindrical spools spaced end-to-end along the axle, each rotating on a different axis tangent to the curved axis of the axle at the location of that spool, and also includes a flexible annular surface sleeve, which is stretched over the full length of the roll and is supported by all of the spools in common. Alternatively, the spools may be omitted, and the roller means may comprise a self-supporting but flexible annular sleeve such as is described and claimed in U.S. Pat. Application Ser. No. 92,657, filed Nov. 25, 1970 and now U.S. Pat. No. 3,783,481 by James O. Gallant for "Curved Roll", and assigned to the assignee of this application.

As in the aforementioned U.S. Pat. No. 3,746,129, means are provided for maintaining a selected, limited volume of liquid in the annular passageway which is defined between the axle and the roller means and encloses the bearings. The volume is selected so that a thin layer of the liquid is formed on the inner circumferential surface of the roller means by centrifugal force as the roll turns at operational speeds, and the radial height of this rotating body of liquid extends to a level spaced radially outwardly from the axial openings between the races of the anti-friction bearings. Consequently, the rollers or balls of the bearings are not immersed in liquid, although open to the passageway.

Projections or studs are mounted on the axle and extend across the passageway slightly into the rotating body of liquid, to agitate the surface and produce a mist which fills the passageway and lubricates the bearings.

According to our improvement, we provide one or more barrier rings each of which is arranged adjacent to a corresponding bearing, and is specially constructed to pass lubricant lengthwise of the roll when it is rotating, but to block this flow when the roll is stationary. In a preferred form, the barrier rings are located in alternating sections of the annular passageway, which is subdivided by the bearings, and the aforementioned mist-forming studs are located in the remaining sections. Thus one axial face of each bearing is directly exposed to the lubricating mist, and yet the passageway is separated at fairly short intervals by the barrier rings.

When the roll stops, adjacent barrier rings prevent the quantity of lubricant contained in the passageway between them from escaping to accumulate in lower portions of the roll and flood the bearings situated there. If the barrier rings are spaced at suitably close intervals, re-starting therefore takes place with none of the bearings in an initially-flooded condition, and a corresponding savings in power consumption and bearing wear is realized.

DESCRIPTION OF THE DRAWINGS

Preferred embodiments of the invention are shown in the accompanying drawings, in which:

FIG. 1 is a fragmentary view in front elevation and partially in cross-section of a roll according to one embodiment of the invention;

FIG. 1A is an enlarged fragmentary view of a portion of the roll of FIG. 1;

FIG. 2 is a sectional view taken along line 2—2 in FIG. 1, looking in the direction of the arrows;

FIG. 3 is a view in side elevation of a barrier ring employed in the roll of FIGS. 1–2;

FIG. 4 is a developed view of the outer circumferential surface of the barrier ring of FIG. 3;

FIG. 5 is a fragmentary cross-sectional view of a modified embodiment of the invention; and FIG. 6 is a schematic cross-sectional plan view of the roll of FIG. 1, showing the manner of accumulation of lubricating fluid when the roll is at rest.

Referring first to FIGS. 1–4, a first form of the improved roll is indicated generally at 10, and includes an axle 12 which is longitudinally curved in a plane perpendicular to the plane of the paper in FIG. 1. The illustrated roll is generally similar to that shown in the aforementioned U.S. Pat. No. 3,746,129, with the addition of improved anti-flooding means which will be described hereinafter. Only one end of the roll is shown, as the opposite end is a mirror image. The axle 12 is supported in a stationary horizontal position by means of split clamping brackets 36 at either end. The brackets 36 receive spherical elements 38, which permit adjustment of the angular orientation of the axle 12 about its longitudinal axis. The elements 38 are secured to the axle by means of set screws 40. When the axle has been set in the desired angular position, the blocks 36 are clamped against the elements 38 to fix the axle in place.

A series of anti-friction bearings 18 and 19 are spaced along the axle 12 by means of a group of interposed spacer collars 60, 62, and 64. The stacked spacers and bearings are located axially of the roll by means of a collar 68 fixed to the left end of the axle by means of screws 72.

Roller means are provided, comprising an outer annular sleeve 11 of flexible material, such as rubber or fiber-reinforced resin, suitable for the intended application of the roll. This cover is supported in the illustrated construction by an axially-spaced series of annular cylindrical spools 76 and 78, which are rotatably supported on the bearings 18 and 19. Each spool rotates on an individual axis which is tangent to the curved axis of the roll at the location of its supporting bearing or bearings. By this means, the sleeve 11 is caused to rotate in a longitudinally-curved but stable form. The sleeve is located with respect to the spools by means of a sheave 80 secured to an end spool 76 by a screw 82, and an end cap (not shown) secured to a spool 76 at the opposite end of the roll. The roll may be driven by external motive means through a belt (not shown) trained around the sheave 80, if desired; if the roll is not externally driven, the sheave may be replaced by a plain end cap.

The roller means 11, 76, 78, and the axle 12 define an annular chamber 84 between them which extends through the length of the roll but is subdivided by the enclosed bearings 18 and 19. The bearings do not have the conventional grease-retaining shields, so that the rollers or balls 83 are open to the passageway 84. The ends of the passageway are sealed by ring seals 88 and 90 to prevent oil from leaking out of the ends of the passageway.

For the purpose of supplying oil or other liquid lubricant to the passageway 84, a standpipe 100 is threadedly supported in a bore 20 formed in the axle 12. A series of radial bores 26, preferably four in number, is equiangularly spaced around the axle to communicate the bore 20 with the passageway 84 through aligned openings 102 formed in the spacer 64. The provision of a number of branch passages 26 insures free flow of liquid into the passageway 84 from the standpipe 100 regardless of the angular orientation of the axle, since at least one of these passages must extend downwardly from the axle into the passageway 84. The standpipe 100 additionally serves to vent the interior of the roll, and thereby prevents the application of any excessive pressure to the oil seals 88 and 90.

For convenience of manufacture, end portions 16 of the axle are formed separately from a central portion 17, and are subsequently connected by means of circumferential welds 24. To align the axle parts 16 and 17 prior to welding them together, plugs 22 are employed.

Means are provided for draining lubricant from the roll, which are preferably like those shown in the aforementioned U.S. Pat. No. 3,746,129, but since these means form no part of the present invention, they are not illustrated. A volume of liquid lubricant is maintained in the passageway 84 that is so regulated or selected that as the roll rotates at operational speeds, the liquid forms an annular body 109 which rests against the interior surfaces of the roller means. The radial height L of this body (FIG. 1A) is insufficient to flood the axial openings of the bearings 18 or 19 with liquid. To provide another route than the bearings for free flow of the liquid along the length of the passageway, bypass passages 112 are provided in the spools 78 and 76. These passages connect portions of the passageway which would otherwise be separated by the bearings 18. No such by-pass passages are provided for the end-most bearings 19.

To lubricate the bearings without flooding them, a series of studs or projections 116 are mounted in the spacers 62, and extend radially outwardly to a height slightly beyond the level L of the rotating body 109 of lubricating liquid. The studs 116 agitate the surface of the liquid and produce an oil mist which fills the inner portion of the passageway 84 and the interior portions of the bearings 18 and 19, to lubricate the balls 83.

According to the present invention, one or more barrier rings 301 are placed adjacent to certain of the bearings 18 for the purpose of blocking lubricant flow along the passageway 84 when the roll is stopped, while allowing this flow to take place when the roll is rotating. Preferably, barrier rings 301 are located against the outer races of alternate ones of the bearings 18 throughout the length of the roll. The rings are tightly fitted within the spools 76 or 78. Barrier rings 301 and studs 116 are so distributed along the roll that one surface of each bearing 18 or 19 is open to a section of the passageway 84 which contains a stud 116. Also, each section not containing a stud 116 contains a barrier ring 301, except that the end-most sections adjacent to the end bearings 19 contain both a stud and a barrier ring.

The detailed construction of the barrier rings 301 is shown in FIGS. 2, 3, and 4. One or more helical channels 302 and/or 303 are formed in the outer cylindrical surface of the ring 301, starting at one axial face of the ring and ending at an annular recess 304 in the opposite face of the ring. The channels form two lands 298 and 299 in the outer cylindrical surface of the ring. The helix angle is such that the channels pass around a substantial portion of the circumference of the ring, for example 120°. Preferably there are two such channels of equal and opposite helix angle in each ring, as shown in a developed view in FIG. 4. With this construction of the ring 301 and with the aforementioned tight fit of the ring within a spool 76, 78, each channel of the ring forms a configuration which, in conjunction with the interior of the spool, encloses liquid therein and is closed at its sides to lubricating liquid along the length thereof, but which is open at the ends, where the channel intersects a face of the ring.

In operation with the roll rotating, lubricating liquid added to the roll through the standpipe 100 distributes itself evenly throughout the interior of the roll through the leveling action of centrifugal force to form the annular body 109. This occurs in the manner more fully described in U.S. Pat. No. 3,746,129, except that in the present case it is forced to pass through channels 302 and 303 in the barrier rings 301 in order to reach the annular recess 304, and thence pass circumferentially about the adjacent face of the abutting bearing and through the bypass passage 112 around each bearing to the opposite face. The two channels 302 and 303 in each ring bing diametrally opposite each other, the ring is balanced; and the helix angles being of opposite hand, any tendency to pump lubricant in one direction or the other is neutralized.

When the roll is stationary, the lubricating liquid collects at the bottom of the passageway 84, and tends to drain towards the ends or center of the roll, whichever happens to be lower on account of the direction in which the plane of roll curvature is oriented. However, this drainage is stopped by the lands 298, 299 of the barrier rings 301. The circumferential lengths of the channels 302, 303 are made sufficient that at least one end of each channel is above the level of the pools of lubricating liquid. Although the radial height H (see FIG. 2) of the barrier rings, i.e. the dimension of the ring between its inner and outer circumferential surfaces, is limited, the maximum slope of the roll axis is relatively small, so that each barrier ring can retain all the lubricant contained within the spools 76 or 78 that it serves.

The presence of a barrier ring effectively shields the bearing 18 that it abuts from the lubricant mist produced by the studs 116. Hence it is desirable to place barrier rings only in alternate sections of the passageway 84, that is, adjacent to alternate bearings 18, with studs 116 located in all sections of the passageway which do not contain a barrier ring. In order to adequately lubricate the end bearings 19, however, the section adjacent each end bearing contains both a stud and a barrier ring.

In cases where the sleeve 11 does not have a tight fit over the spools 76 and 78, leakage through the spaces between the spools must be prevented. This can be accomplished by means of O-rings (not shown) fitted into grooves (not shown) in the outer circumference of each spool.

The manner in which the lubricating fluid collects when the roll is stationary is schematically illustrated in FIG. 6, which is a cross-section taken through the plane of roll curvature. In this case the roll is upwardly convex, so that the fluid would tend to accumulate at the bottom of its end portions and flood the endmost bearings 18 and 19. However, the rings 301 confine the fluid between them so that the pools 320 of fluid do not reach the level of the openings between the bearing races.

Although we presently prefer the illustrated arrangement, numerous variations in the details of design of the barrier rings are possible, such as a single helical channel, as much as 360 degrees in length, four channels each approximately 80 degrees in length, and others. Also, the recess 304 can be omitted if the ring is spaced apart from its adjacent bearing 18, instead of abutting it as shown.

An alternative form of barrier ring 305 is shown in FIG. 5. The ring is made of non-magnetic material, and slidably receives a conical-headed valve poppet 306 of magnetic material in a mating conical recess. A magnet 307 is pressed into the bottom of this recess in such a manner that when the poppet 306 is fully seated in the recess, it does not touch that magnet. A duct 308 is formed in the ring 305 parallel to its major axis, near its outside diameter, and communicating with the recess in the ring 305. The ring is pressed into a spool 76 or 78, and is so located that the poppet 306 extends into the bypass passage 112 in the surrounding spool 76 or 78, but when seated in its recess does not touch either the spool or the sleeve 11.

In operation, the poppet 306 acts as a valve, closing the end of the duct 308 when, with the roll stationary, the magnet 307 holds the poppet 306 in its seated position. When the roll turns at more than a predetermined speed, centrifugal force acting on the poppet 306 exceeds the magnetic force, forcing the poppet to move radially outward until it contacts the sleeve 11, thus opening communication for the flow of lubricating liquid through the length of the roll.

It will be appreciated that other forms of centrifugally-operated valves, such as valves in which the movable valve member is held closed by a spring until centrifugal force exceeds the spring preload, could perform the same function as the magnetically-preloaded valve shown in FIG. 5.

What I claim is:
1. A liquid lubricated roll comprising
   axle means having longitudinal curvature parallel to an axial plane thereof, and adapted to be mounted with said passageway on opposite sides of said barrier ring, together with a centrifugally-operable valve means constructed and arranged to close said duct during non-rotation of said roller means, and to open fluid communication through said duct during rotation of said roller means.
2. A roll as recited in claim 1, in which each said barrier means is drivingly and sealingly engaged with an inner circumferential surface of said roller means.
3. A roll as recited in claim 2, in which each said barrier means comprises a ring having an inside diameter larger than that of said axle means, each said barrier ring being formed with at least one channel communicating, at locations disposed radially outwardly from said inside diameter thereof, between portions of said passageway separated by said barrier ring, said channel incorporating means constructed and arranged for closing fluid communication therethrough when said roller means and said ring are stationary, and for opening communication when said roller means and said ring are rotating.
4. A roll as recited in claim 3, in which said means incorporated in said channel includes the extension of said channel, between its ends, at least partially about the circumference of said ring away from the circumferential locations of said ends, so that gravitational liquid flow through said channel from the lower portion of said passageway is blocked during non-rotation of said roller means.
5. A roll as recited in claim 3, in which said means incorporated in said channel comprises centrifugally-operable valve means constructed and arranged to close said channel to gravitational liquid flow during non-rotation of said roller means, and to open fluid communication through said channel during rotation of said roller means.

6. A roll as recited in claim 1, in which each said barrier means comprises a ring formed with at least one axially-extending channel in an outer peripheral surface of said ring and terminating in openings in the opposite axial faces of said ring and which are circumferentially spaced apart about said ring so that no more than one terminating opening of said channel is located at the bottom of said passageway during non-rotation of said roller means.

7. A liquid lubricated roll comprising
axle means having longitudinal curvature parallel to an axial plane thereof, and adapted to be mounted with said axial plane oriented at a selected angle relative to the horizontal plane;
a plurality of bearings spaced along said axle means and having openings in axial ends thereof;
annular roller means circumferentially spaced about said axle means and rotatably mounted on said bearings; said axle means and roller means defining therebetween an annular passageway containing said bearings;
means for supplying a quantity of lubricating liquid to said passageway to form a rotating annular body of liquid against the interior of said roller means during rotation thereof;
and at least one ring-like barrier means located in said passageway within said roller means, said barrier means comprising a ring formed with at least one channel spaced radially outward from the inner circumferential surface of the ring and communicating at its ends with opposite axial faces of said ring and extending, between said ends, at least partially about the circumference of said ring away from the circumferential locations of said ends, said ring engaging said roller means to close the sides of said channel to lubricating liquid so that liquid flow through said channel from the lower portion of said passageway is blocked when said roller means are at rest, said barrier ring being constructed and arranged with said channel to block flow along said passageway of lubricating liquid having less than a selected radial depth in the passageway during non-rotation of said roller means, to pass liquid in excess of said depth during non-rotation of said roller means, and to pass liquid both under and in excess of said depth during rotation of said roller means.

8. A roll as recited in claim 7, in which said channel is of helical form.

9. A roll as recited in claim 7, in which said ring is formed with two said channels, each of helical form, and said channels are of opposite hands.

10. A roll as recited in claim 7, in which said ring is formed with at least two said channels.

11. A roll as recited in claim 7, in which said channel is formed in an outer peripheral surface of said ring.

12. A roll as recited in claim 7, in which one axial face of said ring axially abuts one said bearing, said roller means being formed with a by-pass passage communicating between portions of said passageway separated by said one bearing, said one face of said ring being formed with a circumferentially-extending recess communicating between said channel and the passage by-passing said one bearing.

13. A roll as recited in claim 1, including a plurality of said barrier means spaced apart longitudinally of said roller means and interspersed among said bearings.

14. A roll as recited in claim 13, together with a plurality of means for generating a mist from said annular body of liquid in a radially-inner portion of said passageway which is free of the body of liquid during rotation of said roller means, to lubricate said bearings without flooding them with liquid.

15. A roll as recited in claim 14, in which said passageway is subdivided into sections by said bearings, and comprising in each said section in a alternate sequence axially along said roll at least one of said mist-generating means and said barrier means.

16. A roll as recited in claim 14, in which each said barrier comprises a ring, and in which said passageway is subdivided into sections by said bearings, there being at least one of either said mist-generating means or barrier rings in each section, one of said mist-generating means and one of said barrier rings being located each in a different one of any pair of adjacent sections.

17. A roll as recited in claim 1, in which each said barrier means comprises a ring formed with a duct extending therethrough to communicate between portions of said passageway on axially opposite sides of said barrier ring, together with a centrifugally-operable valve means constructed and arranged to close said duct during non-rotation of said roller means, and to open fluid communication through said duct during rotation of said roller means.

18. A roll as recited in claim 17, in which said valve means comprises a valve member of ferromagnetic material, a valve seat sealingly engageable by radially-inward displacement of said valve member, and a magnet biasing said valve member toward said seat against centrifugal force produced by rotation of said roller means and said barrier ring.

19. For use in a liquid-lubricated roll including a curved axle, a plurality of bearings spaced along said axle and having openings in axial ends thereof, annular roller means circumferentially spaced about said axle and rotatably mounted on said bearings, said axle and roller means defining therebetween an annular passageway containing said bearings, means for supplying a quantity of lubricating liquid to said passageway to form a rotating annular body of liquid against the interior of said roller means during rotation thereof, and means for generating a mist from said annular body of liquid in a radially-inner portion of said passageway which is free of the body of liquid during rotation of said roller means, to lubricate said bearings without flooding them with liquid;
the improvement which comprises a plurality of annular barrier means located in said passageway within said roller means for distributing lubricating liquid to the plural bearings, said barrier means being constructure and arranged, each with an axially-extending channel therein located in its entirety radially outwardly from the circumferentially inner surface thereof, to block gravitational flow longitudinally of said roll of liquid lubricant from depths under a selected level in pools collected in the lower portions of said passageway during non-rotation of said roller means, and to pass lubricating liquid from depths under said selected level in said annular body of liquid during rotation of said roller means.

20. The improvement defined in claim 19, in which each barrier means includes a ring drivingly and sealingly engaged with an inner circumferential surface of said roller means.

21. The improvement defined in claim 19, in which each said barrier means includes a ring formed with at least one axially-extending channel terminating in openings in the opposite axial faces of said ring which are circumferentially spaced apart about said ring so that no more than one terminating opening of said channel is located at the bottom of said passageway during non-rotation of said roller means, said ring engaging said roller means to close the sides of said channel to lubricating liquid.

22. the improvement defined in claim 19, in which each said barrier means includes a ring formed with a duct extending therethrough to communicate between portions of said passageway on opposite sides of said barrier ring, together with a centrifugally-operable vavle means constructed and arranged to close said duct during non-rotation of said roller means, and to open fluid communication through said duct during rotation of said roller means.

23. The improvement defined in claim 22, in which said valve means comprises a valve member of ferromagnetic material, a valve seat sealingly engageable by radially-inward displacement of said valve member, and a magnet biasing said valve member toward said seat against centrifugal force produced by rotation of said roller means and said barrier ring.

24. For use in a liquid-lubricated roll including a curved axle, a plurality of bearings spaced along said axle and having openings in axial ends thereof, annular roller means circumferentially spaced about said axle and rotatably mounted on said bearings, said axle and roller means defining therebetween an annular passageway containing said bearings, means for supplying a quantity of lubricating liquid to said passageway to form a rotating annular body of liquid against the interior of said roller means during rotation thereof, and means for generating a mist from said annular body of liquid in a radially-inner portion of said passageway which is free of the body of liquid during rotation of said roller means, to lubricate said bearings without flooding them with liquid,
  the improvement which comprises a plurality of annular barrier means located in said passageway within said roller means for distributing lubricating liquid to the plural bearings, each said barrier means including a ring formed with at least one channel located radially outward from the circumferentially inner surface of the ring in an outer peripheral surface thereof and communicating at its ends with opposite axial faces of said ring and extending, between said ends, at least partially about the circumference of said ring away from the circumferential locations of said ends so that liquid flow through said channel from the lower portion of said passageway is blocked during non-rotation of said roller means, said barrier means being constructed and arranged to block gravitational flow longitudinally of said roll of liquid lubricant from depths under a selected level in pools collected in the lower portions of said passageway during non-rotation of said roller means, and to pass lubricating liquid from depths under said selected level in said annular body of liquid during rotation of said roller means.

25. The improvement defined in claim 24, in which each said channel is of helical form.

26. The improvement defined in claim 24, in which each said ring is formed with two said channels, each of helical form, and said channels are of opposite hands.

27. The improvement defined in claim 24, in which each said ring is formed with at least two said channels.

28. A liquid-lubricated roll comprising:
  axle means having a longitudinal curvature parallel to an axial plane thereof, and adapted to be mounted with said axial plane oriented at a selected angle relative to the horizontal plane;
  a plurality of bearings spaced along said axle means and having openings in axle ends thereof;
  annular roller means circumferentially spaced about said axle means and rotatably mounted on said bearings; said axle means and roller means defining therebetween an annular passageway containing said bearings;
  means for supplying a quantity of lubricating liquid to said passageway to form a rotating annular body of liquid against the interior of said roller means during rotation thereof;
  and at least one barrier ring located in said passageway sealingly engaged within said roller means and having an inner circumferential surface outward from said axle means, said barrier ring being formed with at least one channel located radially outward of said inner surface thereof and communicating at its ends with opposite axial faces of said ring and extending, between said ends, at least partially about the circumference of said ring away from the circumferential locations of said ends, said barrier ring forming said channel within said roller means to be closed along the sides of the channel to enclose lubricating liquid so that liquid flow through said channel from the lower portion of said passageway is blocked during non-rotation of said roller means, whereby said ring blocks flow along said passageway of lubricating liquid having less than a selected radial depth in the passageway during non-rotation of said roller means and passes liquid having less than said depth during rotation of said roller means.

29. In a liquid-lubricated roll having a curved axle, a plurality of bearings spaced along said axle and annular roller means mounted on said bearings for rotation relative to and about said axle, and wherein said axle and said roller means define a passageway therebetween in which said bearings are disposed and along which liquid lubricant for said bearings can pass, the improvement comprising
  annular barrier means disposed in said passage axially intermediate at least two such bearings, each said barrier means
  1. being fitted within said roller means for rotation therewith and radially extending for a selected height from said roller means into said passageway, to an inner circumference spaced radially outward from said axle, for blocking the gravitational flow along said passageway of liquid lubricant below said selected height, and
  2. having means forming a channel therein communicating with at least one axial face thereof at a location entirely radially outward from said inner circumference thereof, said channel being closed to the passage therethrough of such liquid during non-rotation of said roller means and being open for passing such liquid which is below said height only during rotation of said roller means.

30. In a roll according to claim 29, the further improvement wherein at least at one location said channel means is open to the outer circumference of said barrier means.

31. In a roll as defined in claim 30, the further improvement comprising centrifugally-responsive valve means carried on said barrier means for selectively opening and alternatively closing said channel.

32. In a roll according to claim 29, the further improvement wherein said channel extends between first and second edns communicating with opposite axial faces of said barrier means at locations radially outward from said inner circumference thereof.

33. In a roll according to claim 32, the further improvement wherein said channel means extends circumferentially reltive to said axle between said first and second ends thereof.

34. In a roll according to claim 29, the further improvement wherein said barrier means is fitted within said roller means with the outer circumference of the barrier means sealingly engaged with an inner circumferential surface of said roller means.

35. In a roll according to claim 34, the further improvement wherein said channel means recesses an outer circumferential surface of said barrier means.

* * * * *

UNITED STATES PATENT AND TRADEMARK OFFICE
CERTIFICATE OF CORRECTION

PATENT NO. : 4,018,302
DATED : April 19, 1977
INVENTOR(S) : Richard P. Brown

It is certified that error appears in the above-identified patent and that said Letters Patent are hereby corrected as shown below:

On the first page of the patent, the assignee should be --Mount Hope Machinery Company--. "Incorporated," should be deleted.

Column 5, line 16, change "bing diametrally" to --being diametrically--.

Column 6, claim 1 should read as follows:

--1. A liquid lubricated roll comprising axle means having longitudinal curvature parallel to an axial plane thereof, and adapted to be mounted with said axial plane oriented at a selected angle relative to the horizontal plane;

a plurality of bearings spaced along said axle means and having openings in axial ends thereof;

annular roller means circumferentially spaced about said axle means and rotatably mounted on said bearings; said axle means and roller means defining therebetween an annular passageway containing said bearings;

UNITED STATES PATENT AND TRADEMARK OFFICE
CERTIFICATE OF CORRECTION

PATENT NO. : 4,018,302  Page 2 of 3 pages
DATED : April 19, 1977
INVENTOR(S) : Richard P. Brown It is certified that error appears in the above-identified patent and that said Letters Patent are hereby corrected as shown below:

means for supplying a quantity of lubricating liquid to said passageway to form a rotating annular body of liquid against the interior of said roller means during rotation thereof;

and at least one ring-like barrier means located in said passageway within said roller means and having channel means therein spaced in its entirety radially outward from the inner circumferential surface thereof, said barrier means being constructed and arranged with said channel means to block flow along said passageway of lubricating liquid having less than a selected radial depth in the passageway during non-rotation of said roller means, to pass liquid in excess of said depth during non-rotation of said roller means, and to pass liquid both under and in excess of said depth during rotation of said roller means.--

Column 8, line 12, before "alternate" delete "a".

Column 8, line 16, after "barrier" insert --means--.

UNITED STATES PATENT AND TRADEMARK OFFICE
CERTIFICATE OF CORRECTION

PATENT NO. : 4,018,302

DATED : April 19, 1977

INVENTOR(S) : Richard P. Brown

It is certified that error appears in the above-identified patent and that said Letters Patent are hereby corrected as shown below:

Column 8, line 58, change "constructure" to --constructed--.

Column 8, line 60, change "outwardly" to --outward--.

Column 9, line 15 (claim 22) change "the" to --The--.

Column 9, line 20, change "vavle" to --valve--.

Column 10, line 14, change "axle" to --axial--.

Column 11, line 15, change "edns" to --ends--.

Column 12, line 5, change "reltive" to --relative--.

Signed and Sealed this

Second Day of May 1978

[SEAL]

Attest:

RUTH C. MASON
Attesting Officer

LUTRELLE F. PARKER
Acting Commissioner of Patents and Trademarks